United States Patent [19]

Norman, III

[11] Patent Number: 4,647,971
[45] Date of Patent: Mar. 3, 1987

[54] MOVING VIDEO SPECIAL EFFECTS SYSTEM

[75] Inventor: James W. Norman, III, Gainesville, Fla.

[73] Assignee: Digital Services Corporation, Gainesville, Fla.

[21] Appl. No.: 727,893

[22] Filed: Apr. 26, 1985

[51] Int. Cl.⁴ ............................................. H04N 5/14
[52] U.S. Cl. .................................... 358/160; 358/22; 358/183; 358/903; 340/727; 382/46
[58] Field of Search ................. 358/160, 105, 22, 183, 358/903; 340/727, 728, 724; 382/44, 45, 46

[56] References Cited

U.S. PATENT DOCUMENTS 4,533,952  8/1985  Norman, III ........................ 358/160
4,563,703  1/1986  Taylor et al. ......................... 358/22

Primary Examiner—James J. Groody
Assistant Examiner—Michael D. Parker
Attorney, Agent, or Firm—Charles A. Bevelacqua

[57] ABSTRACT

A method of and apparatus for storing two scan lines of encoded video information for the purpose of writing said information into a main video memory such that the two lines may be transferred to main video memory during horizontal blanking periods when the main video memory is not being read for the purpose of forming a manipulated image on the screen. Two consecutive horizontal blanking periods are used to complete the transfer of each stored line. Further circuits are provided for altering addresses to the main video memory which is properly segmented for the purpose of extracting the target pixel information and the information of several surrounding pixels. The purpose of such access is to supply a pixel interpolator with enough information to construct a proper screen image of the target pixel.

5 Claims, 6 Drawing Figures

CHANGE UPPER ADDRESS OF:

|              | 00 | 01 | 10 | 11 |
|--------------|----|----|----|----|
| WHEN THE TARGET IS: 00 | NC | NC | NC | −1 |
| 01           | NC | NC | NC | NC |
| 10           | +1 | NC | NC | NC |
| 11           | +1 | +1 | NC | NC |

FIGURE 3
HOW TO CHANGE UPPER ADDRESS
FOR GIVEN TARGET PIXEL ADDRESSES

|  |  |  |  |
|---|---|---|---|
| X1,X0 =00 YO=0 | X1,X0=01 YO=0 | X1,X0=10 YO=0 | X1,X0=11 YO=0 |
| X1,X0=00 YO=1 | X1,X0=01 YO=1 | X1,X0=10 YO=1 | X1,X0=11 YO=1 |

FIGURE 1
EIGHT MAP ORGANIZATION OF
VIDEO MEMORY

| | | | | |
|---|---|---|---|---|
| LINE A | UPPER ADDRESS=0 | UPPER ADDRESS=1 | UPPER ADDRESS=2 | X9 ~ X2 |
| LINE B | 00 01 10 11 | 00 01 10 11 | 00 01 10 11 | X1 ~ X0 |
| LINE C |  | X |  |  |
| LINE D |  | X |  |  |
| LINE E |  |  | X |  |
| LINE F |  |  | X |  |

TARGET PIXEL REPRESENTED BY X

FIGURE 2
TARGET PIXELS, AND OTHER PIXELS
NEEDED WITH THEM

CHANGE UPPER ADDRESS OF:

|  | 00 | 01 | 10 | 11 |
|---|---|---|---|---|
| 00 | NC | NC | NC | -1 |
| 01 | NC | NC | NC | NC |
| 10 | +1 | NC | NC | NC |
| 11 | +1 | +1 | NC | NC |

WHEN THE TARGET IS:

FIGURE 3
HOW TO CHANGE UPPER ADDRESS
FOR GIVEN TARGET PIXEL ADDRESSES

MOVING VIDEO SPECIAL EFFECTS SYSTEM

BACKGROUND OF THE INVENTION

The invention relates generally to systems for manipulating video signals and more particularly to a digital system which manipulates moving video images.

Previous video special effects systems utilized analog circuitry for directly manipulating an analog video signal. These analog systems are difficult to maintain and operate, require complex and expansive analog circuitry of a critical nature and must be syncronized with the video input signal. These systems are generally quite limited as to the special effects they can perform and are not easily reprogrammed to perform other effects.

More recently special effect digital systems have been devised which utilize the concept of restructuring memory addresses upon read out to produce a few limited special effects. They are also able to convert between the NTSC North American system of television and the PAL European system. Finally, the most recent form of digital special effects systems disclosed in my pending application Ser. No. 436,066, now U.S. Pat. No. 4,533,952, entitled, "Digital Video Special Effects System," which uses an address restructuring technique to provide a simple and economical means for producing rotative, three dimensional, and other special effects. This system utilizes a coordinate generator, syncronized with the video input signal to produce address signals. The address signals are generated in a predetermined sequence and a predetermined number of such signals are produced during each of the scanned signal portions of the video input signal. A key video signal is modified by an analog to digital converter which produces digital samples of the key video signal syncronized with signals of the coordinate generator means. The address signals correspond to respective memory locations in a memory which stores the pixel information pertaining to the key video signal in the respective memory locations defined by the address signals produced by the coordinate generator. In this manner a key map is produced in the memory which directly corresponds to the video picture defined by the key video signal. Thus, each memory location contains the information necessary to define an on/off pixel that is, it corresponds to a dot having predetermined luminance in the video screen image. A microprocessor is then used with a hardware implemented manipulator to call out selective ones of the pixels to new coordinates of the output scan. The coordinate reassignments being selected in accordance with solutions to a predetermined generalized equation. Only the output address is recalculated. Pixel information of the key video signal remains in its original location in the memory. In this manner, the original key map is preserved and only the output sequence needs to be calculated by the microprocessor. This also improves data access feed since a high speed random access memory may be utilized. The video special effects is driven by software which may be in the form of programmable only memories which may be easily removed or selected from a plurality of available ones. The original pixel information is preserved in the memory but the information is presented on the video screen at coordinate positions which do not necessarily correspond with the position of the stored image. New coordinate positions locate the pixel information on the video screen in a location corresponding to a solution of an effect defining equation.

The system described in my previous application handles one pixel at a time and will not effectively handle moving video images. To handle moving video images, data in the video memory must be addressed more than one pixel at a time since each pixel is a function of several pixels around it. To ensure high visual quality, an interpolation scheme must be employed. The problem is solved by using a suitable memory organization and an addressing scheme by which to pull the appropriate pixels at the appropriate time.

SUMMARY OF THE INVENTION

In a standard television screen display, a half screen or field consisting of odd or even numbered, alternate lines of the screen is first displayed, then a second field or half screen of the alternate even or odd lines is displayed to complete the full screen. The data on each line is in the form of pixels, each pixel corresponding to a dot having predetermined luminance. The pixels are displayed during the 52.65 microseconds of active screen time, and 10.9 seconds is used for horizontal blanking during which no picture information is fed to the screen.

In order to properly manipulate a moving video image, it is necessary not only to access the target pixel but also those pixels around it which affect its appearance on the screen. This necessitates access to 8 pixels, one which precedes the target pixel on the same line as the target pixel, two succeeding pixels on the same line and the four pixels on the next line corresponding to the pixels just described on the target line. However, pixels must be written into memory sequentially as they are received as each video image line is scanned. Therefore, each pixel and each line must have a unique address. In this invention the horizontal scanned and stored pixels will be addressed by X addresses and lines will be addressed by Y addresses. To carry out the interpolation scheme employed, a total of 8 pixels must be accessed simultaneously as described above. The memory must be so organized and an addressing scheme devised so that the desired 8 pixels are pulled out at the right time.

In addition to organizing memory so that all pertinent information to determine the final display is available at the proper time, it is also necessary to provide means whereby a portion of the memory can be read while another portion is receiving pixel by pixel information from a video image to be written in. In other words, it is necessary that the memory have a simultaneous read in-read out capability. This capability is provided by using a bank of buffer random access memories (RAMS). Since the interpolation required for displaying live moving video requires that pixels on each of two successive lines be read and written simultaneously, the necessity to read and write video memory at the same time is solved by utilizing the time during horizontal blanking, when an active image is not needed, to do the writing, and the time during the active scan line to do the reading.

Therefore, it is an object of this invention to provide a digital special effect arrangement for moving live video images.

It is another object of this invention to provide a special effects system for moving video images having a memory and addressing scheme so constructed to permit the reading in of information and writing of information at functionally the same time.

It is another object of this invention to construct a memory for a video special effects system using buffer random access memories so that the memory system is capable of reading and writing information at functionally the same time.

A further object of this invention is to provide a memory organization and addressing system so that the address information for a given target pixel will serve to call up in addition to the target pixels those pixels in the memory which are determined to have an effect upon that target pixel when it is manipulated, in accordance with the desired special effect.

These and other objects, features and advantages of this invention will become apparent from the following description in conjunction with the accompanying drawings.

BRIEF DESCRIPTION OF THE DRAWINGS

FIG. 1 is a chart which ilustrates a memory organization used in the invention.

FIG. 2 shows the groups of pixels which must be accessed in response to a given target pixel address.

FIG. 3 is a chart illustrating how upper address will change to access all of the desired pixels in accordance with the location of the target pixel.

DETAILED DESCRIPTION OF THE INVENTION

Figure 4:
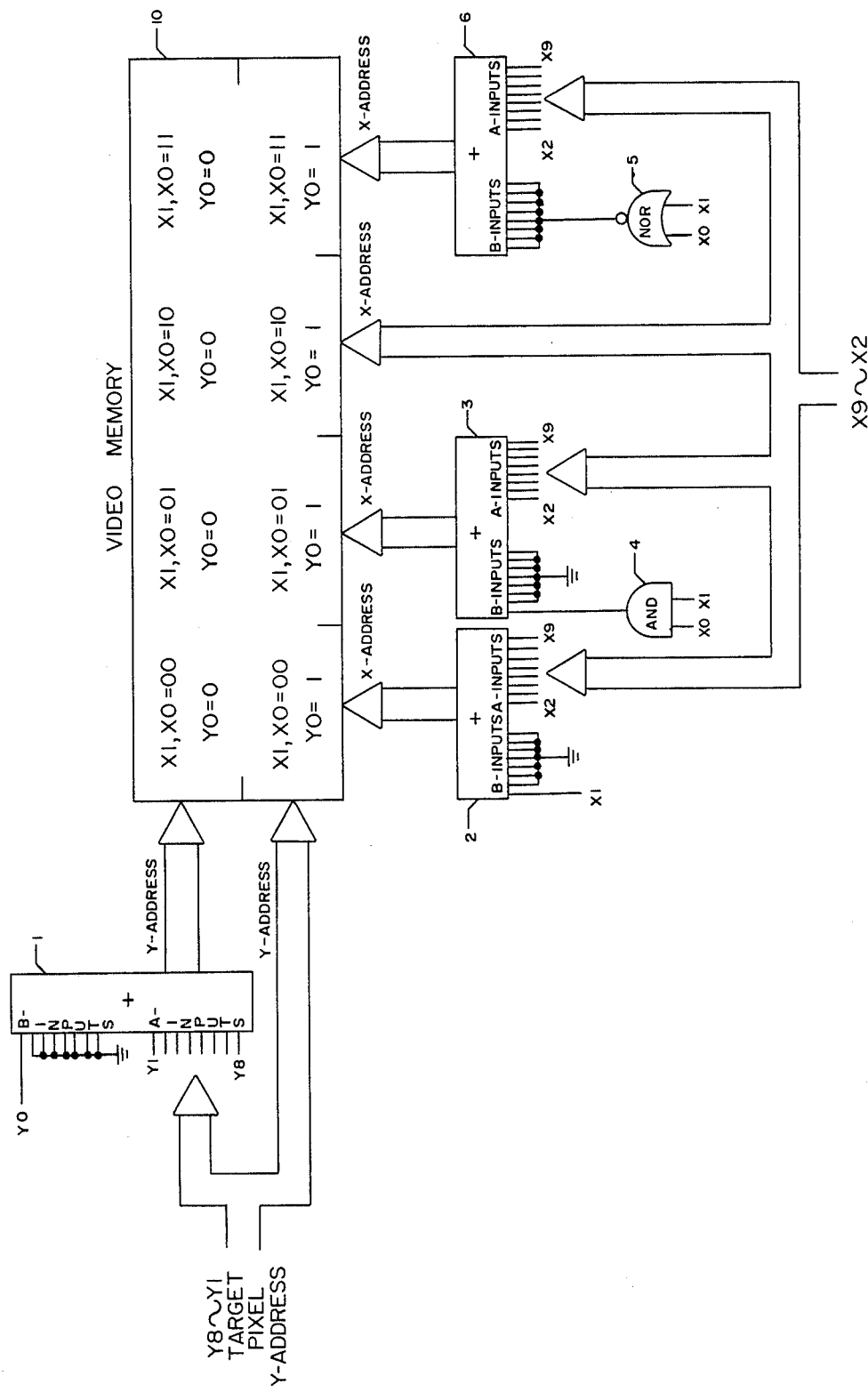
FIG. 4 is a schematic block diagram of the rollover function of the invention.
Figure 5:
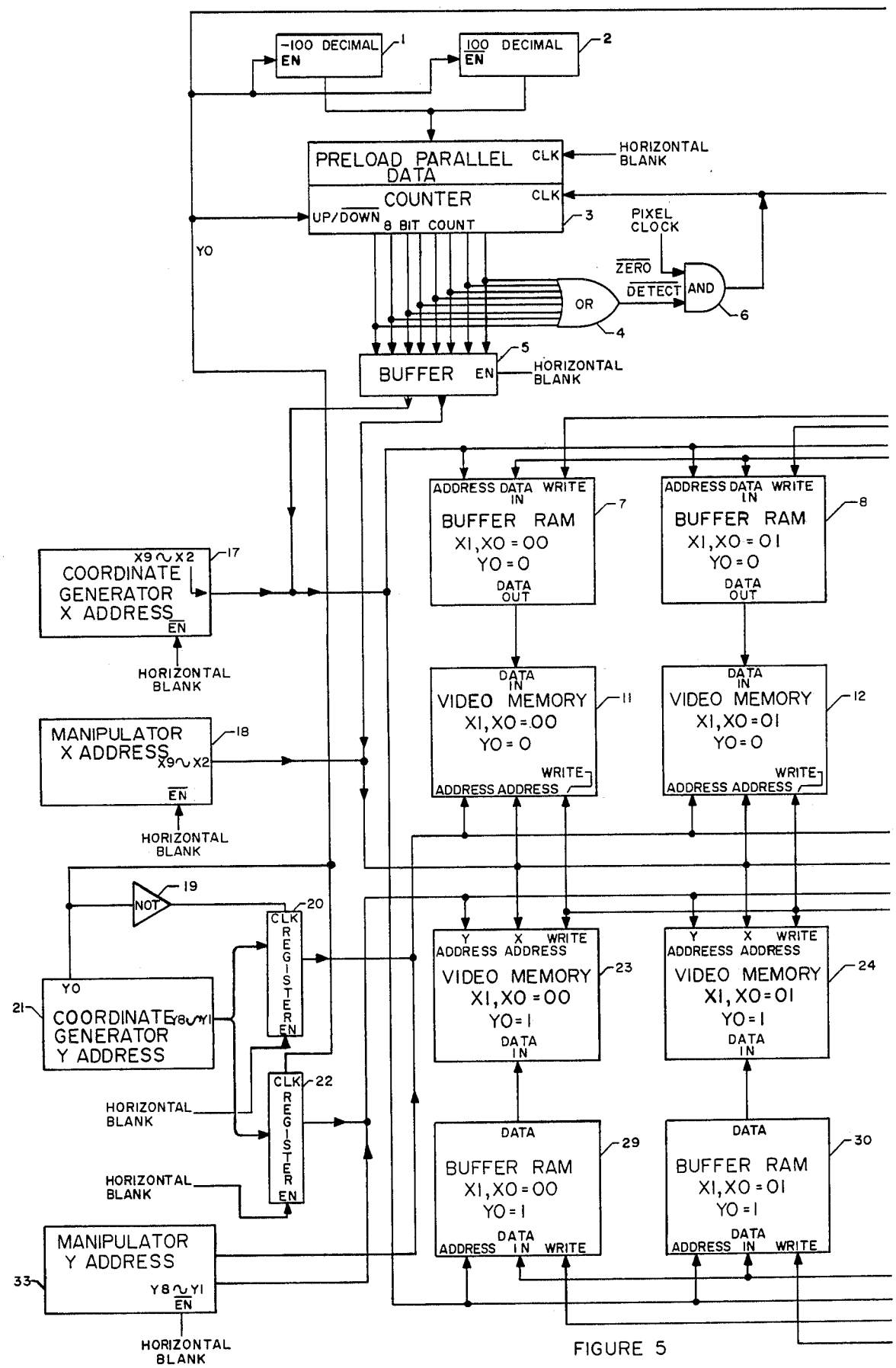
FIGS. 5 and 6 taken together show a block diagram of the system of the invention.
Figure 6:
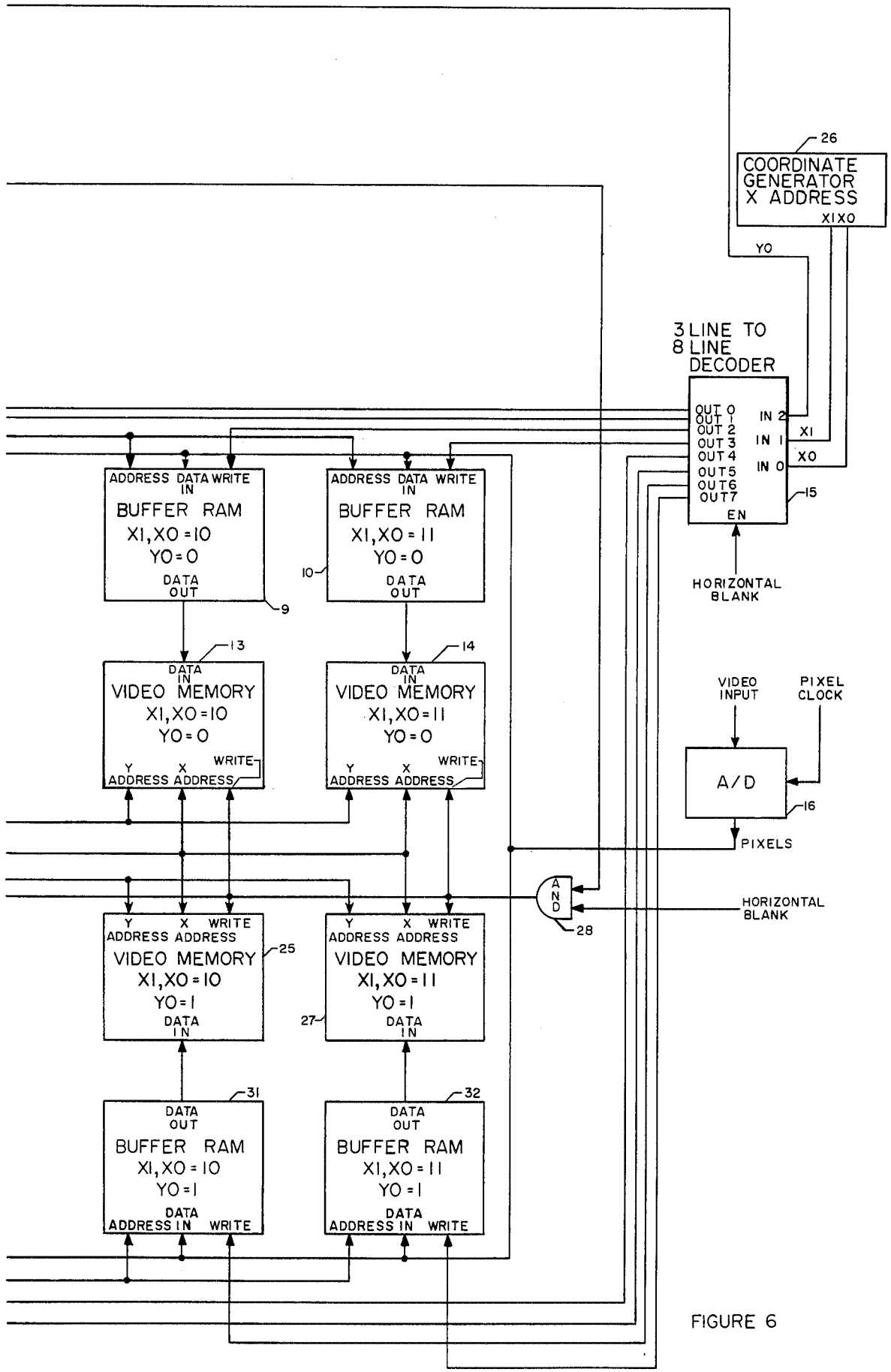

To ensure high visual quality, an interpolation scheme must be employed. If every pixel that goes to the screen is a function of several pixels around it, then means must be provided to access more than one pixel at a time. The problem is solved by using a suitable memory organization and an addressing scheme by which to pull the appropriate pixels at the appropriate time.

The interpolation scheme employed requires the memory to be organized as follows. Pixels must be written into memory sequentially as they are received as an input video image line is scanned. Each line received thus must also have a unique address. The horizontal scanned-and-stored pixels will be accessed by X addresses and lines will be addressed by Y addresses.

There are further considerations to aid this interpolation. In addition to a target pixel accessed by the manipulation circuitry, seven other pixels are desired simultaneously. These seven pixels are, on the same line, the previous pixel and the two subsequent pixels and, on the next line, the four pixels corresponding to the pixels just described on the target line. A total of eight pixels must be accessed simultaneously. If X addresses to the video memory are represented by X9 through X0 and Y addresses are represented by Y8 through Y0 then a suitable memory organization is shown in FIG. 1. For the purpose of memory organization succeeding lines in each field of the television screen are designed as ODD or EVEN.

There is no address bit Y0 to the video memory calling out EVEN and ODD lines. Y0 is inherent to the way the memory is organized, as seen in FIG. 1. An EVEN and ODD line pair of video information can be accessed by applying the same upper address, Y8 through Y1, to both rows of memory maps representing lines of video information.

When one pixel is accessed, three more pixels from its same line and four pixels from the next line are also pulled out for use by the interpolator. If the target pixel is on an EVEN line then the same Y8 through Y1 address is sent to the memory maps that represent ODD lines. This gets the desired next-line information. But if the target pixel is on an ODD line, and the same address is sent to the EVEN maps, the data that would be accessed would be previous line information, not next line information. So when the accessed line is EVEN the Y8 through Y1 bits should go unchanged to both rows of memory, but when the accessed line is ODD a one must be added to the Y8 through Y1 bits going to the EVEN memory so that next-line information is pulled from memory for the interpolator, not previous line information. This is referred to as Y rollover.

The memory organization of FIG. 1 facilitates pulling four pixels on each of two lines simultaneously. Each map may furthermore be individually addressed. In accordance with the invention, as each target pixel is accessed, the pixel previous to it and the two subsequent to it on the same line and the four corresponding pixels on the next line must also be accessed bringing the total to eight needed for interpolation.

FIG. 1 shows that X1 and X0 of a total X9 through X0 X addresses are inherent in the memory organization, and are not actual address lines. Therefore, four successive pixels starting with an X1=0 and an X0=0 pixel all share the same X9 though X2 address. If the target pixel is X1, X0=01 then one previous to it is 00 at the same X9 through X2 address and the two subsequent to it are 10 and 11 at the same X9 through X2 address. But as shown in FIG. 1 if the target location is anything other than 01 then the desired four-pixel pattern will cross the boundary of a different X9 through X2 address. Turning now to FIG. 2. Line A shows the upper address, X9 through X2 of three successive four-pixel sets in accordance with the memory organization of FIG. 1. Line B shows the sequences of how X1 and X0 change for successive pixels along a line. Line C shows that for a target pixel 00 the upper address=0 for the 11 pixel access is actually one less than the upper address=1 of the target pixel. The upper address=1 for 01 and 11 accesses are the same as the upper address for the target pixel. Likewise, Lines D through F show where the target pixel and associated pixels lie with respect to upper addresses. FIG. 3 is a table summarizing for each possible target pixel when a 1 or a −1 must be added to the target pixel address to correctly address the additional pixels in an 8 pixel memory group. This is referred to as X rollover.

In FIG. 4, 10 represents the video memory and 1 represents the Y address adder. The adders as represented in FIG. 4 will add the binary number applied to the A-inputs to the bindery number applied to the B-inputs. Addresses to memory segment Y0=0 pass through ADDER 1. Adder 1 will add the single bit Y0=0 to the memory addresses Y8 through Y1 when Y0=0. Adder 1 will add the single bit Y0=1 to addresses Y8 through Y1 if the target pixel has a Y0=1 Y addresses to the Y0=1 segment of memory are never changed whether Y0=0 or Y0=1 is the target. Therefor Y addresses to the Y0=1 portion of memory are sent directly to the video memory.

Each set of 8 pixels has four X addresses as follows:
X1, X0=00
X1, X0=01
X1, X0=10

X1, X0=11

If a target pixel has a Y0=0 address then the upper bits Y8 through Y1 should go unchanged to the Y0=1 portion of video memory to insure that "next line" interpolation pixels are pulled out. But if the target pixel is Y0=1 then a 1 should be added to Y8 through Y1 going to the Y0=0 portion of memory to insure that "next line" not "previous line" pixels are pulled out. FIG. 4 shows how this change to Y address is carried out. The Y-addresses to Y0=1 memory are never changed whether Y0=0 or Y0=1 is the target. When Y0=0 then the Y0=0 memory Y addresses should be unchanged. In this case ADDER 1 in FIG. 4 adds a single bit Y0=0 to Y8 through Y1 addresses. But if Y0=1 then the addresses to Y0=0 memory should be incremented by 1. In this case Y0=1 memory Y-addresses should be unchanged.

1. X1, X0=00 video memory address.

FIG. 3 shows that in the case of the target pixel being X1, X0=10 and in the case of the target pixel being X1, X0=11 then a 1 should be added to the upper address X9 through X2 and the memory portion corresponding to X1, X0=00. In both cases, the condition happens to be X1=1 of the target address and X0 is not relevant. So ADDER 2 of FIG. 4 adds a single bit, the X1=1 bit, to addresses X9 through X2 for X1, X0=00 memory portion. If X1=0, then a zero is added and there is no change to X9 through X2 for X1, X0=00 memory.

2. X1, X0=01 video memory address.

FIG. 3 shows that only in the case of the target pixel being X1, X0=11 should the upper X9 through X2 addresses to memory portion X1, X0=01 be incremented. AND gate 4 and ADDER 3 of FIG. 4 insure that this increment of the address will occur only when X1, X0=11.

3. X1, X0=10 video memory address.

FIG. 3 shows that regardless of the target pixel the upper X addresses to X1, X0=10 memory should never change. FIG. 4 therefore shows unmodified X9 through X2 going to this memory portion.

4. X1, X0=11 video memory address.

FIG. 3 shows that X9 through address X2 of memory portion X1, X0=11 should be decremented when the target pixel is X1, X0=00, and unchanged for all other targets. NOR gate 5 goes high only when X1, X0=00, so all other targets add 8 bits of 0, by means of ADDER 6, to X9 through X2 address. When X1, X0 cause all the ADDER 6 bits to go high, then X9 through X2 is decremented by 1. This is because in eight bit signed binary notation, a −1 is 1111 1111.

Therefore, it can be seen that when any address is applied to memory to access a target pixel, an address signal to access 7 other pixels necessary for proper operation of the interpolator will be produced.

As previously stated, the access to memory is under the control of the manipulator which controls the display of the manipulated image on a screen. For this purpose, the memory is organized such that the manipulation address has random access to the full frame of video storage even though it may only access one field of the screen. Therefore, the process of reading the memory to produce a manipulated image has the memory totally and exclusively occupied during active image scan time. However, new information by pixels and lines in a regular sequential fashion is constantly being received from the input moving video and must be stored simultaneously to the image generation reading process. Thus, the image generation reading process is actually only accessing one field or half frame and incoming information can be stored in the memory locations for the other field or half frame when it is not being accessed for image generation.

Using the whole image random access techniques described hithertofore makes it inconvenient to have separate field memories because 16 memory portions instead of 8 memory portions would be needed. But to accommodate interpolation necessitated by displaying live moving video, provision must be made to read and write four successive pixels on each of two successive lines simultaneously. This ability to write to two successive lines simultaneously, and the period of non-active image called horizontal blanking, are exploited to solve the problem of needing to read and write the video memory at the same time.

The problem is solved thusly. A line of incoming video is digitized and stored in a buffer ram throughout the active scan line during which the main video memory is being read for screen generation. When horizontal blanking occurs at the end of the scan line the main video memory is no longer needed for screen generation reads. The line of information stored in the buffer ram may now be dumped to the main video memory. The main video memory speed, though fast is not fast enough to receive a whole line's worth during one horizontal blanking. Provision is made therefore to spread the dump of this line over two successive horizontal blankings. Since it takes two horizontal blanking period to dump one buffered line to the main video memory, a second one-line buffer ram must be provided, functionally identical to the first. This will handle the line of incoming image that occurs while the first buffer remains waiting to dump its second half of data during the second horizontal blanking period. The second buffer ram likewise takes two horizontal blanking periods to dump a line of stored image to the main video ram.

The interpolation of the live video also requires that information from four successive pixels on each of the two lines mentioned above be available simultaneously. For this reason the main video memory is also divided into four separate sections per two successive lines. The buffer rams described above are segmented into four separate sections each to reflect this organization.

Outside of horizontal blanking (during the active scan line), and when the line is even, Y1=1, then buffer ram's 7, 8, 9, 10 are filled with data. The pixel count starts at −400 (decimal) and goes to +400 (decimal). 7 gets a pixel, then 8, then 9, then 10 and the sequence starts over again. When horizontal blanking goes active the counter 3 activates, is loaded with −100 (decimal) and counts up to zero at pixel rate. Pixel rate is 70 nanoseconds. One hundred counts is 7 microseconds. This fits into the approximately 10 microseconds available in horizontal blanking. At each of those one hundred counts, all four buffer rams dump a pixel to its respective portion of video memory. At the next horizontal blanking the counter 3 loads with a +100 (decimal) and counts down to zero. At each of these counts, each of the four buffer rams likewise transfer a byte to the proper section of the video memory.

Buffer Ram's 29, 30, 31, 31 function the same as above, receiving data on an ODD line, Y1=1 and transferring that data over the next two horizontal blanking periods.

1. BUFFER RAM OUTSIDE OF HORIZONTAL BLANKING

Outside of horizontal blanking, during the active image imput scan line, the buffer rams, 7, 8, 9, 10, 29, 30, 31, 32 are receiving newly sampled pixels.

a. Address

Each buffer ram has address lines. Outside of horizontal blanking these address lines are fed by the coordinate generator 17 X addresses X9 through X2. Pixels numbered −400 (decimal) to +400 (decimal) are received on each line. Each buffer ram therefore gets (800 pixels/line)/(4 buffer rams/line)=200 pixels per buffer ram.

b. Data

The data in eight bit wide bytes is supplied by an analog to digital converter 16 which is sampling the incoming input video information.

c. Write

Which of the individual segments of the buffer ram gets a write for any one period is determined by the three line to eight line decoder 15. Y0 count determines ODD or EVEN line count and selects one of the two rows of buffer rams. If Y0=0, then 7, 8, 9 or 10 gets a write. If Y0=1, then 29, 30, 31 or 32 gets a write.

The coordinate generator X address 26, X1 and X0, determines which buffer ram in a row gets the write. If X1, X0=00 then 7 or 29, if X1, X0=01 then 8 or 30, if X1, X0=10 then 9 or 31, if X1, X0=11 then 10 or 32, gets a write.

2. VIDEO MEMORY OUTSIDE OF HORIZONTAL BLANKING

Video memory during an active video line (outside of horizontal blanking) is solely being accessed for the purpose of getting image information to be placed on the screen.

a. Address

The video memory at this time gets its X and Y addressing from manipulator X address generator 18 and manipulator Y address generator 33.

b. Data

No data is being input to the video memory. Data is being output from the video memory to the screen.

c. Write

No writes to the video memory at this time.

3. BUFFER RAM DURING HORIZONTAL BLANKING

The buffer ram during each horizontal blanking period transfers half its data to the video memory.

a. Address

Each line of buffer ram's 7, 8, 9 and 10, and 29, 30, 31 and 32 transfers half its data to the video memory during horizontal blanking. Provision is made therefore to do (200 pixels/buffer ram)/(2 horizontal blankings)=100 pixels per buffer ram transfers each horizontal blanking.

The buffer ram address counter (C) provides this function.

At the start of horizontal blanking a starting number is preloaded in the counter 3. If Y0=0, an even line, then 100 decimal 2 is enabled and loaded into the counter 3. Furthermore, Y1=0 selects the count down function. Since the 8 bit count is not zero the zero detect "OR" gate 4 is high enabling the pixel clock through the AND 6. The buffer rams are then supplied counts of 100 through 0 descending through the enabling buffer 5. At zero count the OR 4 goes low disabling the pixel clock through AND 6. No more accesses are then made from the buffer ram's until the next horizontal blanking.

At the next horizontal blanking Y1=1, an odd line, and −100 decimal 0 is enabled and preloaded into the counter. Y1=1 also selects the up count function. Addresses −100 to 0 are provided to the buffer rams as the counter 3 counts up to zero at which time the zero detector OR 4 shuts down the pixel count through AND 6.

b. Data

No data is written into the buffer rams at this time. Each new address provided by the counter 3 does cause a read access to present valid data at the data out.

c. Write

No writes at this time.

4. VIDEO MEMORY DURING HORIZONTAL BLANKING a. Address

1. X address—The X address must match that of the buffer rams. The manipulator X address is therefore disabled and the X address is provided by the Counter 3, just as provided to the buffer ram, as described above.

2. Y address—The video memory does not want the manipulator Y address 33 during horizontal blanking so it is turned off. The coordinate generator Y address 21 changes every line, but it takes two horizontal blanking periods to complete a full line buffer ram transfer. So the coordinate generator Y address 1 may not be used as the video memory address. Two registers 20 and 22 are provided to store the proper Y address until the two half-line transfers are complete. Register 20 stores the Y address when Y0=0 and provides that address to the Y0=0 video memories for the duration of two horizontal blankings until Y0 goes to 0 again. Register 22 provides the same service for the Y0=1 case. NOT gate 19 inverts Y0 for the purpose of providing the necessary high-going edge to clock register 20 whenever Y0 goes to zero.

b. Data

The data that is put in the video memories is the data out from the buffer ram's as described above.

c. Write

At every pixel count during horizontal blanking a new address is provided to the buffer ram and video memory. Writes are therefore enabled at each pixel count through AND 22. When the zero detect 4 shuts off the pixel count, the writes to the video memory are terminated too.

It will be obvious to those skilled in the art that many variations may be made in the preferred embodiment here presented without deporting from the scope of the present invention as described herein and as claimed in the appended claims.

What is claimed is:

1. A method for producing desired special effects in television signals in the NTSC system which method includes the steps of storing television signal data sequentially line by line and bit by bit into a first memory, transferring one half the stored data in parallel from said first memory to a second memory during a first horizontal blanking period of the television signal, transferring the other half of the stored data in parallel from said first memory to said second memory during a second horizontal banking period of the television signal, assigning unique memory addresses to each bit of information as it is being transferred from the first memory to the second memory, rearranging the sequence of the addresses assigned to the bits of information so that an image displayed on a television screen in accordance with the rearranged sequence will produce the desired special effects, calling up target bits from said second memory in accordance with the rearranged sequence of addresses and also calling up all data bits adjacent to the target bits on the same line as the target bits and on the next succeeding line for use by an interpolator prior to display of the target bits on a television screen.

2. The method in claim 1 in which the calling up of information from the second memory for display on the television screen occurs functionally during the same period as the television signal data is being written into the first memory.

3. A television special effects system comprising a first memory for temporarily storing sequential television picture data bit by bit and line by line, a final memory enabled by a horizontal blanking signal of the television picture data to receive data in parallel from said first memory, means for assigning memory addresses in sequence to each bit of data as it is stored in the final memory, means for restructuring the sequence of memory addresses to produce a desired special effect, means to call up target bits of information for display in accordance with said restructured sequence of memory addresses and means activated in response to the call up of the target bits to produce additional memory addresses to call up data bits adjacent to the target bits on the same line and on the next succeeding line of the television picture data for use by an interpolator.

4. A television special effects system comprising a block of random access memories for temporarily storing sequential picture data pixel by pixel, line by line, and field by field as it occurs in a television signal, a pixel clock, means including the pixel clock to determine when and which of the random access memories receives a particular bit of said data, a video memory to which said stored data is transferred in parallel from the random access memories, the data in said video memory being selectively accessible in accordance with an addressing scheme, means including a counter and an AND gate enabled by the occurrence of a horizontal blanking pulse to control the transfer of data from the random access memories to the video memory, means including a three line to eight line decoder to determine which of the random access memories will transfer its portion of said stored data to the video memory, means for assigning addresses in accordance with said addressing scheme to each bit of said stored data as it is transferred to said video memory and means for calling up the bits of stored data by their assigned addresses for display on a television screen in a sequence which will produce a desired special video effect.

5. A television special effects system as set forth in claim 4 further characterized by the transfer of data from each of the random access memories to the video memory over two consecutive horizontal blanking periods and having a pair of Y address registers effective to assign the same Y address to the data being transferred to the video memory until two horizontal blanking pulses have occurred.

* * * * *